July 5, 1960     F. K. DANIEL     2,943,953
FLOORING COMPOSITION AND METHOD OF MAKING THE SAME
Filed July 5, 1957
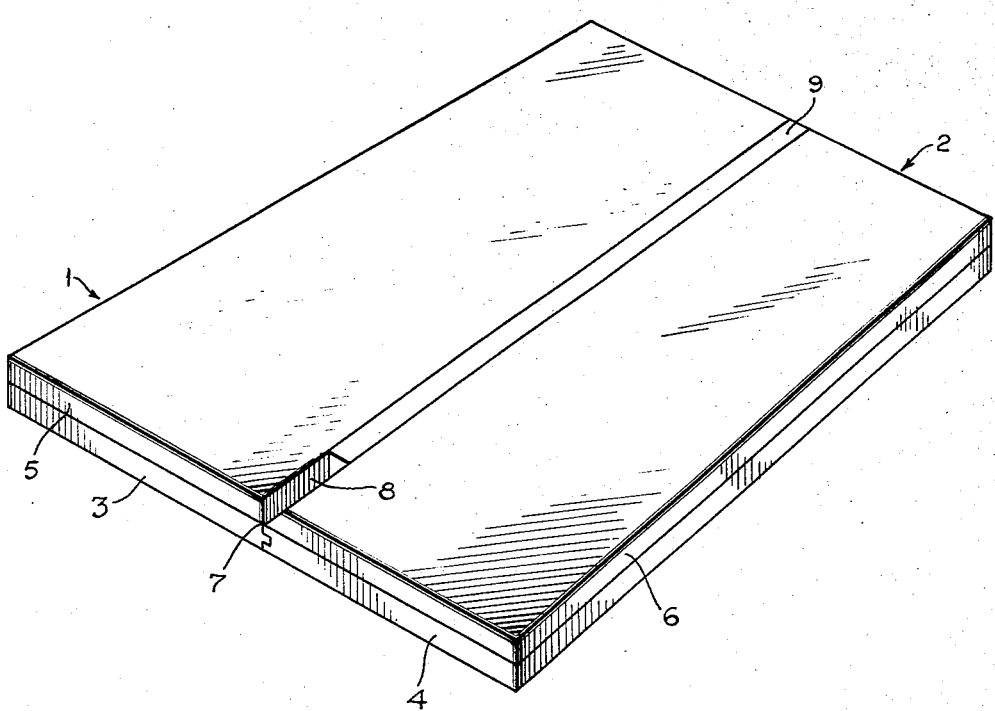
INVENTOR.
FREDERICK K. DANIEL
BY

United States Patent Office 2,943,953
Patented July 5, 1960

2,943,953

FLOORING COMPOSITION AND METHOD OF MAKING THE SAME

Frederick K. Daniel, 125 Cedar Ave., Hackensack, N.J.

Filed July 5, 1957, Ser. No. 670,283

7 Claims. (Cl. 117—43)

The present invention relates to a flooring composition and method of making the same, and more particularly it relates to a flooring composition of great resistance against mechanical and chemical attack which can be made and applied in a simple and economical manner.

The protection of industrial floors has long been a problem especially in chemical and food processing plants where conventional cement floors are quickly destroyed. Similarly, the repair or patching up of damaged or rough concrete floors presents great difficulties because thin layers of new concrete do not bond to underlying old concrete.

Since epoxy resins are noted for their hardness, adhesion and chemical resistance, it has been tried to use epoxy resin compositions as floor topping in order to improve the mechanical as well as the chemical resistance of a floor, and it has also been tried to use epoxy resin compositions as a patching compound for repairing damaged floors without difficult and expensive preparation of the old floor prior to application of the patching composition.

Epoxy patching and flooring compounds consist generally of a liquid epoxy resin and a liquid cross-linking agent. The epoxy resin and the cross-linking agent must be stored separately and can be combined only just prior to application of the flooring compound when, upon mixing of the liquid epoxy resin and the liquid cross-linking agent, the same react with each other so as to form a hardening mixture. In some cases it has been found advantageous to add a third material, namely, an extender, such as sand, to the mixture of the liquid epoxy resin and liquid cross-linking agent in order to reduce the unit cost of the flooring compound and to improve certain mechanical properties of the finished product. The more inert aggregate, such as sand, is used in relation to a given quantity of epoxy resin, the lower become the costs per unit of the flooring compound. Conventionally, the liquid epoxy resin and the cross-linking agent are mixed together and then mixed with the inert aggregate just prior to application of the flooring composition.

It is an object of the present invention to provide a simplified method of preparing such flooring compositions.

It is another object of the present invention to provide a protective floor covering which can be produced and applied in a simple and economical manner.

It is a further object of the present invention to provide a protective floor covering of great resistance against chemical and mechanical attack and having a smooth surface.

It is yet another object of the present invention to provide a high quality flooring composition containing a larger relative amount of inert aggregate than was heretofore possible.

It is still another object of the present invention to provide a simplified method of preparing a floor patching compound which method can be carried out without requiring manual contact with the ingredients of which the floor patching compound is formed.

Other objects and advantages of the present invention will become apparent from a further reading of the description and the appended claims.

With the above and other objects in view, the present invention mainly consists of a method of producing on a surface a solid body adapted to cover and protect the surface, comprising the steps of adding to and intimately mixing with a mixture consisting essentially of sand and a liquid epoxy resin adapted to be cross-linked and hardened, a liquid cross-linking agent in an amount sufficient to cross-link and harden the epoxy resin so as to form an intimate hardening mixture, and applying the thus-formed intimate hardening mixture to a surface to be covered and allowing the hardening mixture to harden thereon, thereby forming a protective covering on the surface.

The present invention also contemplates a method of producing a flooring composition adapted to be applied to a surface as a protective covering, comprising the steps of mixing a first mixture consisting essentially of a liquid epoxy resin adapted to be cross-linked and hardened, and a reactive diluent containing epoxy groups and being in an amount sufficient to reduce the viscosity of the liquid epoxy resin to thin fluidity, with sand in an amount of up to 6 times the weight of the first mixture, so as to form a second mixture, and intimately mixing the thus-formed second mixture with a liquid cross-linking agent in an amount sufficient to cross-link the epoxy groups in the second mixture and to harden the epoxy resin therein, thereby forming a hardening flooring composition adapted to form a protective covering of great resistance against mechanical and chemical attack.

According to a preferred embodiment, the present invention consists of a method of producing a patching compound adapted to be applied to a surface, comprising the steps of introducing into a deformable container, containing a mixture consisting essentially of sand and a liquid epoxy resin adapted to be cross-linked and hardened, a liquid cross-linking agent in an amount sufficient to cross-link and harden said epoxy resin so as to form a hardening mixture, and deforming the container so as to intimately mix the contents of the same, thereby forming in the container a hardening patching compound adapted to be applied to a surface as a covering of great resistance against mechanical and chemical attack.

It is also within the scope of the present invention to provide as a new article of manufacture, for use in a flooring composition, an intimate mixture consisting essentially of between 5 and 7 parts by weight of sand, the major portion of which passes through a 16 mesh screen and is retained on a 70 mesh screen and 1 part by weight of a liquid epoxy resin adapted to be cross-linked and hardened by means of a liquid cross-linking agent.

While, conventionally, the three groups of ingredients of the flooring composition (namely the epoxy resin and diluent, the cross-linking agent or catalyst, and the inert aggregate such as sand) had to be stored separately and were singly mixed together in such a manner that shortly before applying the flooring composition the epoxy resin was first mixed with the cross-linking agent and the thus obtained mixture was then mixed with the inert aggregate, such as sand, it has been found, according to the present invention, that it is possible and advantageous only to mix the inert aggregate with either the epoxy resin or the cross-linking agent and to store this mixture for any desired length of time. When it is desired to apply the flooring composition, all that is needed is then to add to the mixture of sand and epoxy resin the cross-linking agent, or to a mixture of sand and cross-linking agent the epoxy resin.

Thereby, the number of separate components which have to be combined just prior to application of the flooring composition is reduced from 3 to 2. The intimate mixing of one of the liquid components, i.e., either the epoxy resin or the cross-linking agent, with the inert aggregate, can be accomplished in any of a number of kneaders and mixers well known in the art. Excellent results were obtained by preparing the premixture of sand and one of the two liquid components with a so-called "muller." When it is desired to incorporate coloring material into the mixture, the same may be simultaneously mixed in or may preferably be added on a 3 roller mill.

By thus prewetting the dry inert aggregate with one of the two liquid components, the subsequent incorporation of the other of the liquid components is greatly facilitated.

Surprisingly, it has been found that much more inert aggregate can be incorporated in the flooring composition while still maintaining a smooth troweling consistency of the paste, by adding to the aggregate first the epoxy resin (including an epoxy diluent), and by subsequently adding the cross-linking agent to the thus formed premixture immediately prior to application of the flooring compound. In other words, a flooring composition of a given quality, prepared by first mixing sand and epoxy resin, will contain more sand than a flooring composition of the same quality prepared by first mixing sand and cross-linking agent and adding the epoxy resin and diluent just prior to application of the flooring compound.

The term "normal mixing" as used herein applies to the prior art methods of first mixing the epoxy resin (with or without diluent) with the cross-linking agent, and thereafter admixing sand; or to first mixing sand and cross-linking agent and thereafter admixing the epoxy resin (with or without diluent). Thus "normal mixing" is different and in contrast to the method of the present invention, according to which the aggregate or sand is first mixed with the epoxy resin and subsequently the cross-linking agent is admixed to the previously formed mixture of sand and epoxy resin.

The term "epoxy resin composition" is used herein to denote the liquid epoxy resin with or without an epoxy diluent.

It has also been found that a protective surface, formed according to the present invention by application of a flooring composition produced by first mixing sand and epoxy resin and subsequently adding the cross-linking agent, will result in the formation of a denser and less porous flooring than was previously the case. This is of particular importance when the protective floor covering is applied in food plants, hospitals or other installations where a nonporous and impervious floor is essential in order to prevent bacteria contamination and to facilitate maintenance of a clean floor.

Without attempting to give a theoretical explanation as to why the sequence in which the individual components of the flooring composition are combined is of such great significance with respect to the mechanical and chemical resistance and surface structure of the applied floor covering, it must be stated that experiments have shown that for equal consistency and workability of the flooring composition, which is first obtained in paste form, from 10 to 20 percent more inert aggregate can be incorporated if the aggregate has first been wetted with the epoxy resin and epoxidized diluents or plasticizers prior to the addition of the cross-linking agent.

The following examples of typical flooring and patching compositions, according to the present invention, are given as illustrative only, the present invention, however, not being limited to the specific details of the examples.

EXAMPLE I

Preparation of mixture "A"

| | Grams |
|---|---|
| Washed and dried sand | 1400 |
| Liquid epoxy resin | 220 |
| Butyl glycidyl ether | 52 | are thoroughly mixed in a mechanical mixer, kneader, tumbler, or muller. The resulting mixture will not show settling or separation and can be stored for prolonged periods of time.

Preparation of mixture "B"

| | Grams |
|---|---|
| Liquid polyamide (such as is known for instance as "Versamid 125") | 40 |
| Tri(dimethyl aminomethyl) phenol | 14 |
| Red oxide | 30 | are thoroughly mixed whereby the pigment (i.e., the red oxide) may be ground into the polyamide or into the mixture of the amide and amine on a 3 roller mill, and a viscous liquid is obtained.

The viscous liquid "B" is now intimately mixed with the mixture "A" until a homogeneous soft paste is obtained. It has been found, according to the present invention, that the average particle size as well as the particle size distribution of the sand or other inert aggregate has an important effect on the consistency of the final product. A 100 mesh sand, for instance, is quite unsuitable, and so is a coarse sand bigger than 16 mesh screen size. Generally, the aggregate should be of such size that substantially all of it passes through a 16 mesh screen and is retained on a 70 mesh screen.

A typical example of a preferred size distribution of the aggregate shows:

| | Percent |
|---|---|
| Retained on a #16 sieve | .2 |
| Retained on a #20 sieve | 28.0 |
| Retained on a #30 sieve | 56.2 |
| Retained on a #40 sieve | 14.5 |
| Retained on a #50 sieve | 1.0 |
| Retained on a #70 sieve | .1 |
| | 100.0 |

Either spherical or sharp, irregular shaped sand can be used as aggregate according to the present invention. However, the sharp beach sand provides better non-skid properties of the finished protective floor covering. When a smoother surface with less traction is desired, an Ottawa type smooth sand may be used.

The liquid epoxy resin of Example I has the following characteristics:

| | |
|---|---|
| Viscosity at 23° C. centipoises | 20,000–40,000 |
| Specific gravity at 23° C. | 1.16–1.18 |
| Epoxy equivalent | 200–230 |

Products of this description are known in the trade as Araldite 6020 (Ciba), Epon 828 (Shell), Epi-Rez 510 (Jones-Dabney) and ERL–2774 (Bakelite).

The butyl glycidyl ether, acting as a reactive diluent or viscosity reducer in Example I has the following characteristics:

| | |
|---|---|
| Viscosity at 23° C. centipoises | 3 |
| Specific gravity at 23° C. | 0.905–0.910 |
| Epoxy equivalent | 140–150 |
| Molecular weight | 130 |

Reactive diluents which may be substituted for the above butyl glycidyl ether include, among others, phenyl glycidyl ether, allyl glycidyl ether, octylene oxide, styrene oxide, cresyl glycidyl ether. These ethers may be used in larger proportions than indicated in Example I. However, when added in a proportion greater than 20% of the amount of the epoxy resin, they do not materially further reduce the viscosity, but they do cause a lessening of the chemical and mechanical resistance of the composition and, consequently, it is preferred to limit the addition of the reactive diluent to the proportion required to reduce the viscosity of the epoxy resin to thin fluidity.

The 2,4,6-tri(dimethylaminomethyl) phenol of mixture "B" of Example I is a relatively non-toxic tertiary amine known in the trade as DMP-30 (Rohm & Haas) and is one of a group of amine cross-linking agents. Other amines which may be used for the same purpose include: dimethylaminomethylphenol, benzyldimethylamine, metaphenylene diamine, triethylene tetramine. However, amines of low toxicity, like DMP-30, are preferred.

The fluid polyamide resin, known as Versamid 125, belongs to the family of dimerized and trimerized unsaturated fatty acids of vegetable oils polymerized with ethylene diamine. It has the following characteristics:

| | |
|---|---|
| Amine value | 290–320 |
| Viscosity at 23° C. centipoises | 450,000–550,000 |
| Specific gravity | 0.97 |

Versamid 125 serves as cross-linking agent for the epoxy groups and also as plasticizer. The relative amount of tertiary amine may be reduced and that of the polyamide resin may be increased. Such a shift in the relative amounts of cross-linking agents will result in a softer, more flexible and resilient, but slower curing flooring compound of somewhat lower chemical resistance. Conversely, a greater proportion of the tertiary amine and a lower proportion of the polyamide produces a faster setting, harder, more brittle flooring of higher chemical resistance.

EXAMPLE II

Titanium dioxide or another inorganic pigment or combination of such pigments may be substituted for the red oxide of Example I.

EXAMPLE III

Emery, garnet, aluminum oxide powder, or other inert hard materials may be substituted for the sand of Example I.

EXAMPLE IV

*Preparation of mixture "A"*

| | Parts (by weight) |
|---|---|
| Washed and dried sand | 1450 |
| Liquid epoxy resin as in Example I | 220 |
| Epoxydized cashew nut oil derivative (known as Cardolite NC513-3MCo) | 65 |

*Preparation of mixture "B"*

| | Parts (by weight) |
|---|---|
| Fluid polyamide as in Example I | 38 |
| DMP-30 | 18 |
| TiO$_2$ | 25 |
| Black iron oxide | 1 |

As in the previous examples, mixture "A" is prepared in a mixer or tumbler and stored separately from mixture "B" until just before application when the two mixtures are intimately mixed together. Mixture "B" is preferably prepared in a mixer or on a 3 roll mill. The pigments in mixture "B" serve the double function of imparting a desired color (according to the present example, a natural cement color) and as an indicator for the completeness of the mixing process. Mixing must be continued until a uniform color is obtained, i.e., until all streaks have disappeared.

The epoxidized cashew nut derivative also serves a double function, namely, as a plasticizer and as a viscosity reducer for the epoxy resin. It has the following characteristics:

| | |
|---|---|
| Viscosity at 23° C. centipoises | 75–100 |
| Specific gravity | .960–.975 |
| Epoxy equivalent | 475–575 |

The thus obtained flooring composition produces a flooring of excellent resilience at low temperatures.

By admixture of the butyl glycidyl ether as per Example I, the viscosity of the liquid epoxy resin will be reduced from 20,000 centipoises to 300 centipoises, while the cardolite of Example IV reduces the viscosity from 20,000 to about 1,500 centipoises. In any event, it is essential to reduce the viscosity of the liquid epoxy resin to below 3,000 centipoises and preferably to below 2,000 centipoises without sacrificing too much of the chemical resistance of the epoxy resin. These requirements are met by the diluents described in the present application when the same are used in amounts of about between 15 and 20 parts per weight for each 100 parts of the epoxy resin. While the cardolite does not reduce the viscosity as much as does the butyl glycidyl ether it develops hardness faster and forms a flooring which is particularly resistant against chipping.

In spite of the plasticizing effect of the epoxidized cashew derivative, it has been found that this composition develops hardness faster than the composition of Example I. A floor coating placed in the afternoon develops enough hardness overnight to make the floor usable for all except very heavy traffic the following morning.

By using a combination of the diluents mentioned in Examples I and IV, the time during which the compound can be placed and troweled, as well as the time to reach sufficient hardness to support traffic can be regulated. A composition allowing at least one hour for placing after the components are mixed, and suitable for an overnight setting up is given in Example V.

EXAMPLE V

*Preparation of mixture "A"*

| | Parts |
|---|---|
| Washed and dried sand | 1450 |
| Liquid epoxy resin as in Example I | 220 |
| Butyl glycidyl ether | 25 |
| Epoxydized cashew nut oil derivative | 22 |

*Preparation of mixture "B"*

Same as in Example IV.

The process as described in the foregoing examples, according to which sand and epoxy resin are first mixed together and the cross-linking agent is subsequently added to the first formed mixture, is quicker, easier and simpler to handle by the workmen on the job than the conventional process of separately introducing the dry sand and each of the two liquid components. The flooring composition obtained, according to the present process, will form a harder and denser floor or patch and will develop strength at a faster rate than was hitherto possible. During the mixing and application stage, the flooring composition, according to the present invention, forms a much softer and more cohesive mass than is obtained by reversing the sequence so as to premix the polyamide-amine with the sand and adding the epoxy resin diluent to the aggregate-catalyst combination. Thus, the method of producing the flooring composition, as described in the examples, constitutes a substantial and unexpected improvement over either of the two other ways in which the individual ingredients of the flooring composition may be combined.

Where larger quantities of material are involved, the mixtures "A" and "B" can be intimately mixed together on the job, for instance, by trowel, rake, hoe, shovel or mechanical mixer. However, for producing relatively small amounts of patching material, it is preferred, according to the present invention, to combine the individual components in the manner described in the following example:

EXAMPLE VI

Mixture "A" produced, for instance, as described in Example I or IV, is placed in an oversized plastic bag which is then closed by a rubber band. For instance, between 400 and 600 grams of the mixture "A" described in Example I are put into a bag of 6" diameter and 12" length. Preferably, the bag is provided with a semicircular or curved bottom. The bag may be formed of a 1½ to 2½ mil thick laminated mylar-polyethylene or cellophane-polyethylene sheet but must contain at least one layer which cannot be penetrated by the cross-linking agent.

The appropriate amount of cross-linking agent or agents plus coloring material is placed in a collapsible metal tube or in a plastic container.

To prepare the patching compound, the entire quantity of mixture "B," for instance according to Example I, is squeezed from the collapsible tube or plastic container into the bag containing mixture "A." Thereafter, the bag is closed again, for instance by a rubber band or wire, and the materials in the bag are kneaded together by hand from the outside until a homogeneous mixture is obtained. The thus finished flooring or patching composition can be expelled from the bag without being touched by hand, for instance by turning the bag inside out. In place of the above described bag, any other suitable deformable container may be used which can be squeezed or kneaded from the outside so as to thoroughly mix the contents thereof.

The intimately mixed flooring composition is then placed on the surface to be covered and is troweled into place. It has been found advantageous to allow the flooring composition to remain in contact with the surface for 1 to 2 minutes before troweling starts and to wet the trowel with an organic solvent such as a petroleum hydrocarbon to prevent the composition from sticking to the trowel and to make it stick better to the floor or other surface.

According to the present invention, the flooring composition can be placed easily and expeditiously, and an unusually smooth finish can be obtained by use of a roller. The roller may either be coated with a release compound such as silicone, or it may be coated with a non-adhering plastic such as a fluorocarbon (Teflon), or an ordinary paint roller such as is used in painting walls, may be wetted with an organic liquid such as a paint thinner, and rolled lightly over the flooring composition of the present invention until the surface is smooth. This rolling step may be carried out after troweling or it may take the place of the troweling. The surface obtained by rolling is smoother, denser, and easier to clean than the surface obtained by any other method of application, yet the hardened compound retains its resistance to slippage or skidding provided a proper inert aggregate is used. Rolling with a roller wetted with a paint thinner has also proved to be a highly advantageous method for making a good "feather-edge" finish.

It is also within the scope of the present invention to cover large surface areas with the flooring compound herein described by employing mechanical extruding devices from which a band of flooring compound of predetermined widths and thickness is extruded. This may either be accomplished by moving the extruding device over a stationary surface at a speed equal to the speed with which the band of flooring composition is extruded, and in a direction opposite to the direction in which the extruded band of flooring composition leaves the extruding device; or the extruding device may be stationary and the surface to be coated, for instance of wood or laminated panels may be moved underneath the extrusion orifice at a speed equal to the speed with which the band of flooring composition is extruded. In this case, the surface to be coated moves of course in the same direction in which the band of flooring composition is extruded. The layer or band of flooring composition which in this manner is placed on the surface to be coated, may be bevelled at its longitudinal edges or at one of its longitudinal edges, and, after forced curing the thus formed strip of coated laminated sheets or the like may be cut into pieces of any desired lengths. These pieces may be joined later side by side by being so positioned and by filling the channel formed by the beveled edge or edges between adjacent sheets with an epoxy compound. In this manner it is possible to build a continuous monolithic structure. The extruding device may comprise a hopper into which the freshly prepared flooring composition of the present invention is filled and from which hopper the flooring composition passes through a worm gear to a slot forming the extrusion orifice. The extrusion device may include or may be connected with a mixer in which the flooring composition is mixed and from which it is filled into the hopper, and it may also include rolls for rolling the freshly laid band of flooring composition. These rolls are preferably coated with Teflon or a release compound or wetted with an organic solvent.

The term "sand," as used in the present specification and claims, is meant to denote not only conventional sand but also any other inert aggregate, such as the materials mentioned in Example III and the like. The term "rolling," as used in the present claims, is meant to denote the forming of a surface with a paint roller or the like, as described above.

The flooring composition, according to the present invention, is also most useful in repairing surface-damaged concrete floors, leaks around pipes, cracks in concrete pavements, damages in terrazzo floors, holes in walls, etc., as well as for fastening loose bricks and the like. It may also be used advantageously for forming protective surfaces other than floors, such as prefabricated panels, side panels, walls, ceilings and the like. The present flooring composition forms a practically unbreakable bond with such diverse materials as cement, brick, wood, glass, plaster, metals, ceramics, asbestos, shingles, and other dry construction materials.

It is also most useful as a thin topping for floors in chemical plants, food processing plants, stables, hospitals, on ship decks and for other surfaces subject to severe abrasion or chemical conditions, or for surfaces hazardous due to slippery conditions.

The flooring composition, according to the present invention, sets up within two to four hours, depending on the temperature and other variables of the location. It reaches great strength within 48 hours and maximum strength and hardness in less than one week. One of the outstanding characteristics of the flooring composition, according to the present invention, is its dimensional stability which eliminates cracking, shrinkage and liquid penetration. Another outstanding feature is its resistance against alkalies, acids, solvents, fats, oils, steam, bacteria, sugars, etc.

The present invention also contemplates as a new article of manufacture, a construction element comprising, in combination, a plurality of panels, each panel including a supporting sheet and a protective coating covering at least one face of the supporting sheet, the protective coating consisting of a layer essentially consisting of a hardened mixture of an inert finely divided aggregate, an epoxy resin, a reactive diluent, and a cross-linking agent for the epoxy resin and for the reactive diluent, the layer being bevelled along at least one edge of the panel, and the bevelled edge of one of the panels abutting an edge of another of the plurality of panels, so as to form along the abutting edges a channel between adjacent layers of the hardened mixture, and a hardened epoxy resin filling the channel, whereby a monolithic multi-panel structure is formed.

The above described feature of the present invention, both as to its construction and method of operation, together with additional objects and advantages thereof, will be best understood from the following description of a specific embodiment when read in connection with the accompanying drawing, in which the single figure shows a perspective view partially in cross-section of a construction element according to the present invention.

Referring now to the drawing, two panels 1 and 2 are shown abutting along one edge. The panels include supporting sheets 3 and 4, and protective layers 5 and 6, respectively. Supporting sheets 3 and 4 may be made of wood, laminated wood or any other suitable material. Protective layers 5 and 6 consist essentially of hardened mixture of an inert aggregate such as sand, and an epoxy resin which has been hardened by addition of a suitable cross-linking agent. Layer 6 is bevelled along edge 7 so as to form between layers 5 and 6 a channel 8. Channel 8 is filled with a hardened epoxy resin 9 and in this manner panels 1 and 2 are combined into one monolithic structure. It is of course also possible to bevel adjacent edges of both layers 5 and 6 to form a wide-angle channel.

Without further analysis, the foregoing will so fully reveal the gist of the present invention that others can, by applying current knowledge readily, adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing a flooring composition adapted to be applied to a surface as a protective covering, comprising the steps of introducing into a deformable container containing a mixture consisting essentially of between five and seven parts of sand and one part of a liquid epoxy resin composition adapted to be cross-linked and hardened, a liquid cross-linking agent in an amount sufficient to cross-link and harden said epoxy resin so as to form a hardening mixture; and deforming said container so as to intimately mix the contents of the same, thereby forming in said container a hardening flooring composition adapted to be applied to a surface as a protective covering of great resistance against mechanical and chemical attack.

2. A method of producing a flooring composition adapted to be applied to a surface as a protective covering, comprising the steps of introducing into a bag made of deformable sheet material and containing a preformed mixture consisting essentially of between five and seven parts of sand and one part of a liquid epoxy resin composition adapted to be cross-linked and hardened, a liquid cross-linking agent in an amount sufficient to cross-link and harden said epoxy resin so as to form a hardening mixture; and manually kneading said bag so as to intimately mix the contents of the same, thereby forming in said bag without direct contact between the kneader and the contents of said bag a hardening flooring composition adapted to be applied to a surface as a protective covering of great resistance against mechanical and chemical attack.

3. A method of producing on a surface a solid coating adapted to cover and protect said surface, comprising the steps of adding to and intimately mixing with a preformed mixture consisting essentially of between five and seven parts of a finely subdivided sand-like inert aggregate and one part of a liquid epoxy resin composition, a liquid cross-linking agent in an amount sufficient to cross-link and harden said epoxy resin and reactive diluent; and extruding a band of the thus-formed hardening mixture onto said surface, thereby forming on said surface a protective coating consisting of said band of said hardening mixture.

4. A method of producing on a surface a solid coating adapted to cover and protect said surface, comprising the steps of adding to and intimately mixing with a preformed mixture consisting essentially of between five and seven parts of a finely divided sand-like inert aggregate and one part of a liquid epoxy resin composition, a liquid cross-linking agent in an amount sufficient to cross-link and harden said epoxy resin and said reactive diluent; extruding a band of the thus-formed hardening mixture onto said surface; rolling the free face of said band; and allowing the same to rest until hardened, thereby forming on said surface a hardened protective coating.

5. A method of producing a hardening mixture adapted to be applied to a surface and to form thereon a protective covering, comprising the steps of intimately mixing between five and seven parts by weight of sand with about one part by weight of a liquid epoxy resin adapted to be cross-linked and hardened so as to form a non-hardening, storable mixture; and, shortly before application of said hardening mixture, intimately mixing said non-hardening mixture with a liquid cross-linking agent in an amount sufficient to cross-link the epoxy groups in said epoxy resin and to harden the same, thereby forming a hardening mixture ready for application to a surface for the forming of a protective covering thereon.

6. A method of producing a hardening mixture adapted to be applied to a surface and to form thereon a protective covering, comprising the steps of intimately mixing between five and seven parts by weight of sand the major portion of which passes through a 16 mesh screen and is retained on a 70 mesh screen with about one part by weight of a mixture of a liquid epoxy resin adapted to be cross-linked and hardened and of a reactive diluent containing epoxy groups and being present in an amount sufficient to reduce the viscosity of said liquid epoxy resin to thin fluidity, so as to form a non-hardening, storable mixture; and shortly before application of said hardening mixture, intimately mixing said non-hardening mixture with a liquid cross-linking agent in an amount sufficient to cross-link the epoxy groups in said non-hardening mixture, thereby forming a hardening mixture ready for application to a surface and for the forming of a protective covering thereon.

7. In a method of forming a hardened protective surface layer from a trowelable mass by application, troweling and permitting to harden of a mass formed by normal mixing of a liquid epoxy resin composition adapted to be solidified and hardened by cross-linking, a liquid cross-linking agent adapted to cross-link, solidify and harden said liquid epoxy resin and a proportion of sand sufficient to form a solid, coherent surface and up to a maximum proportion beyond which the surface becomes porous, the improvement which comprises, in the following sequence, the step of forming a mixture of between five and seven parts by weight of sand for each part of liquid epoxy resin; and the step of intimately mixing said mixture with said liquid cross-linking agent so as to form an easily trowelable hardening mixture thereof just prior to application and troweling of said hardening mixture, whereby upon troweling thereof a smooth nonporous surface layer lightly resistant against mechanical and chemical attack is formed even with proportions of sand exceeding said maximum proportion.

References Cited in the file of this patent

UNITED STATES PATENTS

| | | |
|---|---|---|
| 2,337,523 | Lum | Dec. 21, 1943 |
| 2,347,233 | Abernathy | Apr. 25, 1944 |
| 2,494,295 | Greenlee | Jan. 10, 1950 |
| 2,512,996 | Bixler | June 27, 1950 |
| 2,602,785 | Wiles | July 8, 1952 |
| 2,682,515 | Naps | June 29, 1954 |
| 2,705,223 | Renfrew et al. | Mar. 29, 1955 |
| 2,859,530 | Renaud | Nov. 11, 1958 |

FOREIGN PATENTS

| | | |
|---|---|---|
| 516,107 | Canada | Aug. 30, 1955 |

OTHER REFERENCES

Renfrew et al.: Ind. Eng. Chem. 46, 2226–32 (1954).

UNITED STATES PATENT OFFICE
CERTIFICATE OF CORRECTION

Patent No. 2,943,953                           July 5, 1960

Frederick K. Daniel

It is hereby certified that error appears in the printed specification of the above numbered patent requiring correction and that the said Letters Patent should read as corrected below.

Column 10, line 55, for "lightly" read -- highly --.

Signed and sealed this 6th day of December 1960.

(SEAL)
Attest:

KARL H. AXLINE
Attesting Officer

ROBERT C. WATSON
Commissioner of Patents